Nov. 15, 1966 F. F. MOORE 3,285,526

MAGNETIC TAPE PLAY-BACK EQUIPMENT

Filed Aug. 23, 1963 3 Sheets-Sheet 1

INVENTOR.
FRED F. MOORE

BY

Alfred W. Petchaft
ATTORNEY

Nov. 15, 1966 F. F. MOORE 3,285,526

MAGNETIC TAPE PLAY-BACK EQUIPMENT

Filed Aug. 23, 1963 3 Sheets-Sheet 2

INVENTOR.
FRED F. MOORE

BY Alfred W. Petchaft

ATTORNEY

MAGNETIC TAPE PLAY-BACK EQUIPMENT

Filed Aug. 23, 1963 3 Sheets-Sheet 3

INVENTOR.
FRED F. MOORE
BY
Alfred W. Petchaft
ATTORNEY 3,285,526
Patented Nov. 15, 1966

3,285,526

MAGNETIC TAPE PLAY-BACK EQUIPMENT

Fred F. Moore, Irving, Tex., assignor to Music & Sound, Inc., Dallas, Tex., a corporation of Texas Filed Aug. 23, 1963, Ser. No. 304,049
4 Claims. (Cl. 242—55.19)

This invention relates in general to certain new and useful improvements in magnetic tape play-back equipment and endless magazines for use in conjunction therewith.

In conventional tape play-back machines at the present time, the magnetic tape is driven at a constant speed through a power operated roller or so-called "capstan" against which the tape is held in frictional driving engagement by a spring-biased pressure roller. When such play-back equipment is loaded or unloaded, it is necessary to retract the pressure roller to an inoperative position in which it will not interfere with the insertion or withdrawal of the magazine in which the tape is held. Usually, the pressure roller is swung from a substantially horizontal inoperative position upwardly through an opening in the bottom of the tape magazine into a substantially vertical position, during which movement it engages the interiorly presented face of the tape and pushes the tape outwardly to an opening in the end wall of the tape magazine for frictional driving engagement with the capstan. Obviously, the pressure roller, in such tape play-back equipment, must move through a substantial distance at fairly high speed and will, therefore, engage the tape with considerable force, snapping forward into engagement with the capstan. The resultant forces will normally tend to stretch the tape slightly, but will also tend to damage the magnetic emulsion on the surface thereof. Moreover, since the pressure roller swings about a remotely located pivot, which is transverse to the axis of rotation to the capstan, there is a tendency for the pressure roller to engage the lower longitudinal margin of the tape somewhat more tightly from the upper margin thereof so that the frictional driving pressure will not be distributed uniformly across the entire line of engagement between the tape and the capstan.

It is, therefore, the primary object of the present invention to provide a magnetic tape play-back or recording device in which the tape is held in contact with the capstan by means disposed wholly within and forming part of the tape magazines.

It is another object of the present invention to provide magnetic tape play-back or recording device and tape-magazines which cooperate in a unique manner so that wear and strain on the tape is minimized.

It is a further object of the present invention to provide a device of the type stated into which the tape magazines can be very easily and simply inserted.

It is also an object of the present invention to provide an endless loop magazine which is simple but nevertheless highly efficient in construction, and embodies means by which the circulation of the tape is facilitated.

It is an additional object of the present invention to provide an endless loop magazine having a tape-braking mechanism which is shifted to disengaged position as a result of engagement between the capstan tape and pressure-roller.

It is a further object of the present invention to provide a tape-magazine of the type stated in which a spring-bias applied to the pressure roller not only forces the pressure roller and tape into frictional driving engagement with the capstan, but also serves both to hold the magazine in operative position and assist in the removal of the magazine.

With the above and other objects in view, my invention resides in the novel features of form, construction, arrangement, and combination of parts presently described and pointed out in the claims.

Figure 1:
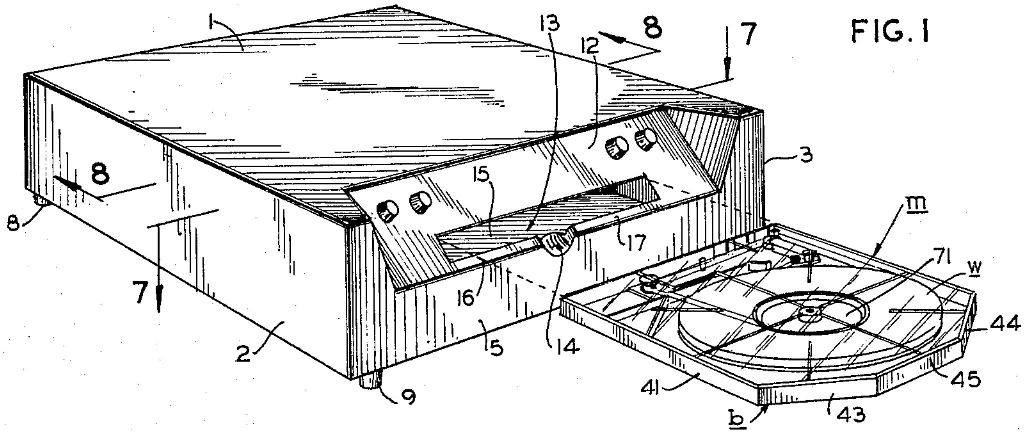
FIG. 1 is a perspective view of a tape play-back machine and tape magazine constructed in accordance with and embodying the present invention.
Figure 2:
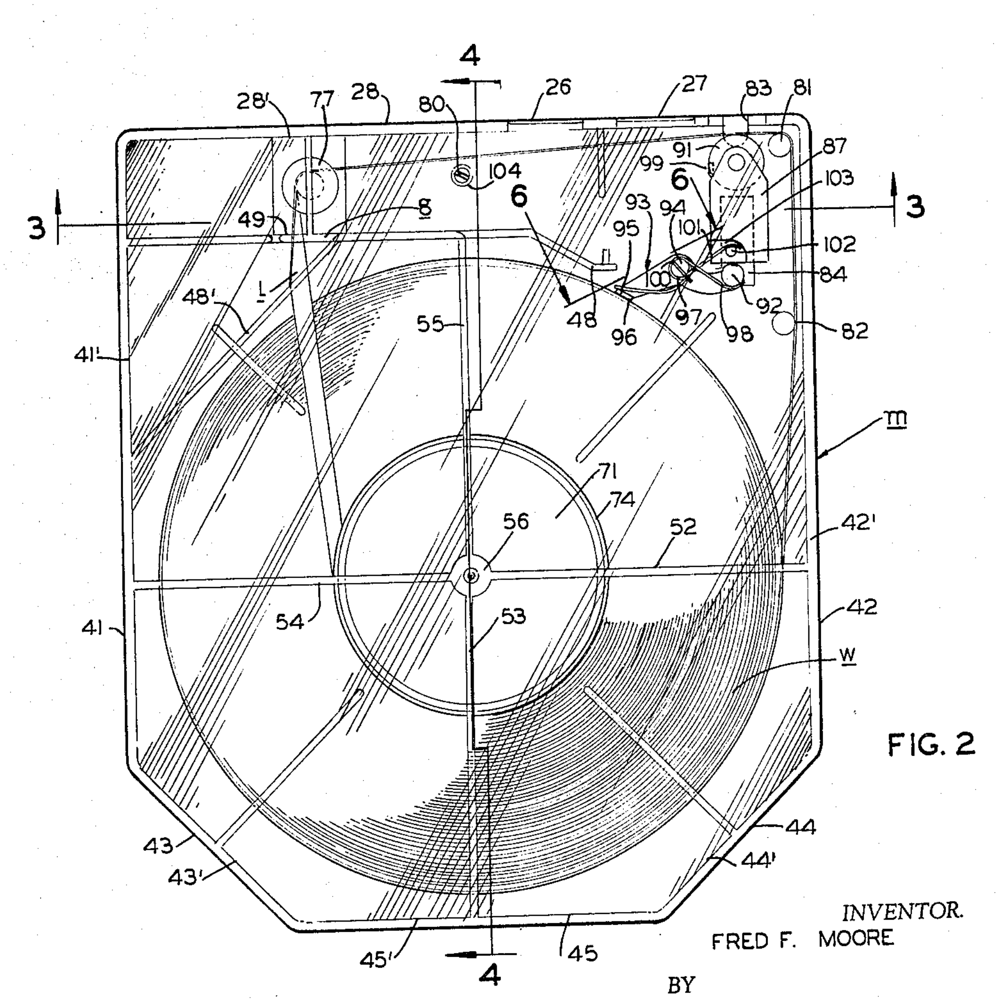
FIG. 2 is a top plan view of the tape magazine forming a part of the present invention.
Figure 3:
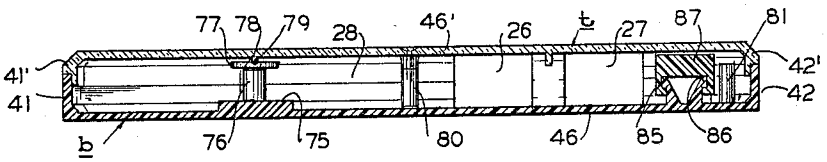
Figure 4:
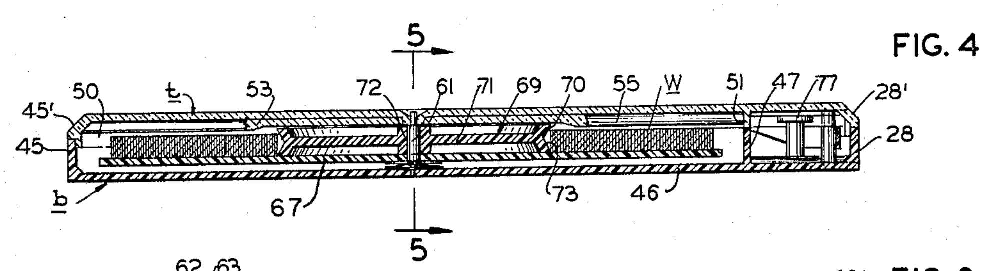
Figure 5:
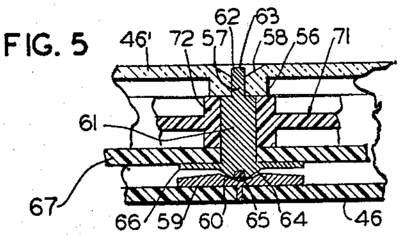
Figure 6:
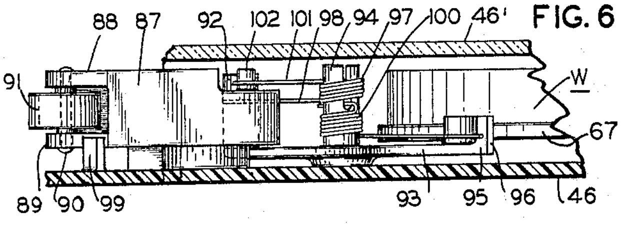
Figure 7:
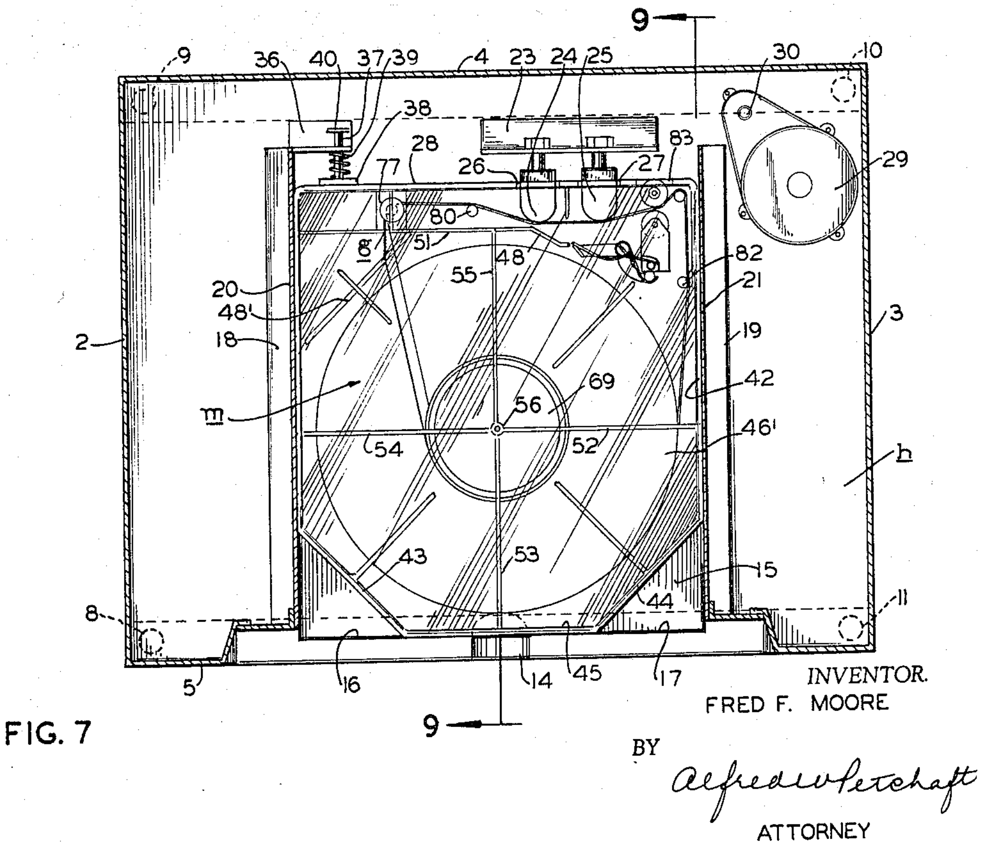
Figure 8:
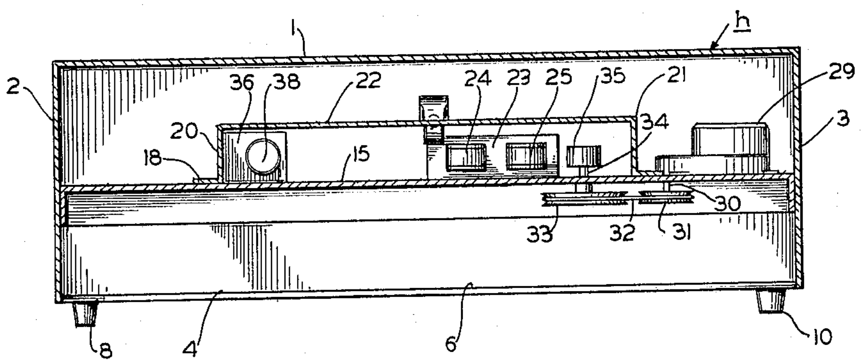
Figure 9:
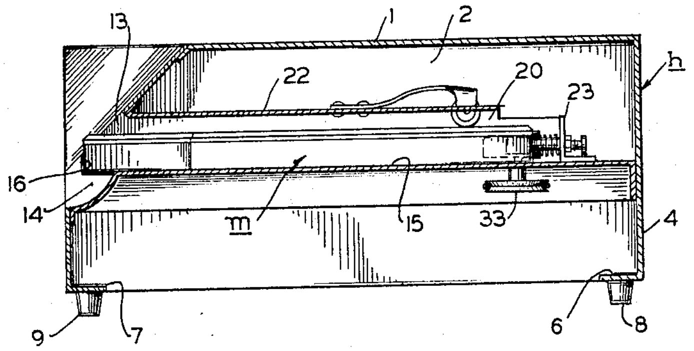
Figure 10:
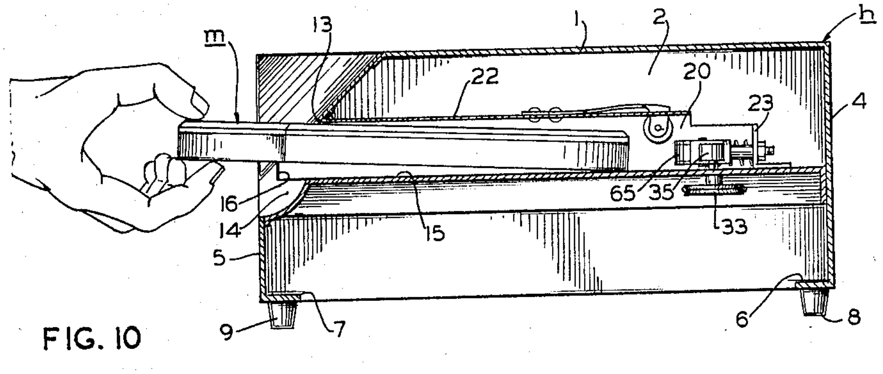

FIGS. 3 and 4 are transverse sectional views taken along lines 3—3 and 4—4, respectively, of FIG. 2;

FIG 5 is a fragmentary sectional view taken along line 5—5 of FIG. 4;

FIG. 6 is a fragmentary sectional view taken along line 6—6 of FIG. 2;

FIGS. 7 and 8 are horizontal and vertical sectional views taken respectively along lines 7—7 and 8—8 of FIG. 1;

FIG. 9 is a vertical sectional view taken along line 9—9 of FIG. 7 showing the tape magazine in fully inserted position within the tape play-back machine;

FIG. 10 is a sectional view similar to FIG. 9 showing the tape magazine partially inside and partially outside of the tape play-back machine, that is to say in an intermediate position which the tape-magazine would assume both upon insertion into and removal from the tape play-back machine.

Referring now in more detail and by reference characters to the drawings which illustrate a preferred embodiment of the present invention, A designates a tape playback machine which comprises a generally rectilinear outer housing having a top wall 1, side walls 2, 3, rear wall 4, and front wall 5. Formed integrally with and extending horizontally across the lower margins of the rear wall 4 and front wall 5 are inwardly extending flanges 6, 7, which are respectively provided with short downwardly projecting rubber pads 8, 9, 10, 11, the latter serving as short cushioning legs by which the tape playback machine A may be supported upon the top surface of the table, desk, or other similar structure.

The front wall 5 is provided with an inset oblique panel 12 which serves as a convenient support for the various control knobs which are conventional in this type of equipment and also is provided with an elongated rectangular opening 13 which is slightly greater in horizontal length and vertical height than the corresponding dimensions of a tape-cartridge or magazine *m* which is adapted for insertion therethrough. Midway of its lower margin, the opening 13 is provided with an arcuate downwardly extending finger slot 14, the lower central portion of which curves upwardly and inwardly and is flush with a horizontal partition or cartridge-deck 15. It will be noted by reference to FIGS. 1, 9, and 10 that the lower horizontal margin of the opening 13 is located inwardly and upwardly from the lower horizontal margin of the oblique panel 12, and, moreover, is located upwardly from the cartridge-deck 15 so as to provide two retention shoulders 16, 17, disposed on opposite sides of the finger slot 14.

Mounted upon the upper face of the cartridge-deck 15 interiorly of the opening 13 and arranged in symmetrical relation thereto are opposed parallel guide rails 18, 19, having vertical flanges 20, 21, which are integrally connected or tied together across their top margins by means of a horizontal tap wall 22. The space defined by the flanges 20, 21, and top wall 22 is such as to snugly, but nevertheless slidably, accommodate the tape-cartridge or magazine *m*. Rigidly mounted upon the upper face of the cartridge-deck 15 at the rear end of the space into which the tape-cartridge or magazine *m* will fit is a flange bar 23 for operatively supporting conventional transducers or playback heads 24, 25, which are relatively elongated in design and adapted to project well into the magazine *m* through openings 26, 27, formed in the forward transverse wall 28 thereof, when the magazine end is inserted fully into the play-back device A, substantially as shown in FIG. 7.

Operatively mounted upon the cartridge-deck 15, interiorly of the housing *h* is a conventional electrical motor 29 which is mechanically connected through a conventional gear-reduction train, not specifically shown in detail, to a drive shaft 30 which carries a pulley 31 connected by means of a belt 32 to a driven pulley 33, the latter being pinned, keyed or otherwise rigidly secured upon the lower end of a spindle-shaft 34 which is operatively journaled in and extends vertically through the cartridge-deck 15. At its upper end, the spindle-shaft 34 is provided with a tape driving roller 35 which has an axial width approximately equal to the width of the magnetic tape and is so located that its underface will be spaced upwardly from the upper face of the cartridge-deck 15, all as best seen in FIG. 8 and for purposes presently more fully appearing.

Also rigidly mounted upon the upper face of the cartridge-deck 15 is a transversely extending flange bar 36 for slidably supporting a horizontal rod 37 which is provided on its forward end with a flat abutment plate 38. Disposed encirclingly about the forward end of the rod 37 in abutting engagement at its opposite ends against the plate 38 and the flange bar 36 is a compression spring 39 which normally urges the rod 37 forwardly until its forward movement is arrested by the stop washer 40, all as best seen in FIG. 7 and for purposes presently more fully appearing.

The electrical circuitry to the motor 29 and the electronic circuitry associated wtih the erasing head 24 and transducer or playback head 25 are not shown in specific detail, inasmuch as any conventional type of circuitry may be employed and the circuitry as such is not part of the present invention.

The tape-cartridge or magazine *m* is formed, preferably though not necessarily, from a transparent synthetic resin, such as polyvinyl chloride or the like, and preferably consists of a box-like bottom member *b* and top member *t*. The bottom member *b* integrally includes the transverse forward wall 28, two parallel side walls 41, 42 angular corner walls 43, 44, and a short end wall 45, the latter being parallel to the transverse forward wall 28. The walls 28, 41, 42, 43, 44, and 45 are of uniform height and are all connected by a bottom wall 46 in the form of a box-like enclosure which is transversely subdivided by a partition 47 extending laterally from side wall 41 parallel to the forward wall 28 to a point approximately opposite the opening 26 and is there provided with rearwardly directed oblique sections 48, 48', which terminate in inwardly spaced relation to the side walls 41, 42. The partition 47 is slightly shorter in height than the several walls 28, 41, 42, 43, 44, 45, so that the upper margin thereof lies in a plane somewhat below the common plane of the upper margins of the walls 28, 41, 42 43, 44, 45. Also integrally formed with the bottom wall 46 and side wall 41 is an auxiliary partition 49 which is in lengthwise alignment with, but spaced endwise from, the partition 47 in the provision of a gap *g*.

The top member *t* extends in closurewise position across the upper margins of the bottom member *b* and integrally includes corresponding somewhat beveled marginal walls 28', 41', 42', 43', 44', and 45', which are respectively in registered alignment with the walls 28, 41, 42, 43, 44, and 45 of the bottom member *b*. Moreover, the wall members 28', 41', 42', 43', 44', and 45' are integrally connected by a top wall 46' and are provided with a continuous depending short indented flange 50 which is disposed in snug-fitting retentive engagement around the upper interior peripheral margins of the walls 28, 41, 42, 43, 44, and 45, all as best seen in FIGS. 3 and 4. The top wall 46' is provided on its under or interior face with a narrow depending rib 51 which is substantially identical in shape to, and in abutting registration with, the partition 47 when the top member *t* is in closure-forming position upon the bottom member *b*. The top member *t* is also integrally provided on its under or interior face with four reinforcing ribs 52, 53, 54, 55, which, in effect, quarter the substantially square space defined by the walls 41, 42, 43, 44, 45, and the partition 47, intersecting centrally of such space in a common depending cylindrical boss 56, which is provided with a central co-axial aperture 57 opening upon the outwardly presented face of the top wall 46', in a shallow somewhat conical clearance recess 58. Rigidly mounted upon the upper or interior face of the bottom wall 46 in axial alignment with the cylindrical boss 56 is a circular metal bearing disk 59 having a central upwardly opening arcuate recess 60, the center point of which is in concentric alignment with the center line of the aperture 57. Rotatably mounted between the aperture 57 and the recess 60 is a metallic spindle 61 having a diametrically reduced pin-like bearing extension 62 snugly, but rotatably, mounted in the aperture 57 and terminating in a hemispherical top surface 63 which is located just below the plane of the outwardly presented surface of the top wall 46'. At its lower end, the spindle 61 is provided with a somewhat hemispherical end surface 64 which is recessed and peened to receive a hardened steel ball 65 which projects externally therethrough and is seated bearingwise in the recess 60. Just above the hemispherical surface 64, the spindle 61 is provided with a diametrically enlarged relatively thin disk-like collar 66 which underlies and supports a relatively large-diameter circular plastic disk 67 having a central aperture 68 which fits snugly, but rotatably, around the spindle 61. Seated rotatably upon the upper face of the disk 67 is a core-spool 69 which integrally includes a peripheral rim 70 which is connected by a disk-shaped central web 71 to a cylindrical hub 72 which is concentrically apertured for snug-fitting, but rotatable, disposition around and upon the spindle 61. As will be seen by reference to FIG. 4, the core-spool 69 rests flatwise and rotatably upon the disk 67 and the upper surface of the hub 72 bears against the under face of the boss 56. The rim 70 has an inwardly indented V-shaped groove 73 for accommodating the innermost convolution of a continuous or endless winding *w* of conventional magnetic tape. It should also be noted, in this connection, that the upper edge face 74 of the core-spool 69 will ride freely against the under or inwardly presented faces of the ribs 52, 53, 54, 55, which are preferably rounded slightly in cross-sectional contour so as to impose minimal frictional resistance upon the rotation of the core-spool 69.

Formed integrally upon, and projecting upwardly from, the bottom wall 46 and spanning the gap *g* is a low-height rectilinear block 75 into which is mounted an upstanding cylindrical post 76 made of nylon or other similar anti-friction material and interiorly provided with a diametrically enlarged flat head 77 which is so located that its upper face 78 will rest snugly against the under side of a short reinforcing rib 79 formed integrally on the under face of the top wall 46' of the top member *t*. Moreover, the post 76 is located so that its axial center line is approximately midway between the opposed peripheral faces of the front wall 28 and the partitions 47, 49. Also formed interiorly with, and projecting upwardly from, the bottom wall 46 are three cylindrical guide posts 80, 81, and 82 arranged respectively along the walls 28 and 42, as shown in FIG. 7.

Also formed in the forward wall 28 and the bottom wall 46 is an L-shaped drive roller opening 83 which is of such size and position that it will clear the spindle-shaft 34 and tape driving roller 35 when the magazine *m* is pushed into place within the tape playback machine A, as shown in FIG. 9. Integrally formed upon the upper or integrally presented face of the bottom wall 46 in longitudinal alignment with the L-shaped opening 83 is a guide-block 84 being provided along its top margins with laterally presented rectilinear guide rails 85, 86. Slidably mounted upon the guide-block 84 and held in operative position thereon by the guide rails 85, 86, is a shiftable pressure-block 87 which is horizontally kerfed at its forward end to provide a pair of vertically spaced ears 88, 89, which supports a vertical pin 90, the latter, in turn, operatively supporting a relatively large-diameter pressure roller 91. At its rear end the pressure-block 87 bears operatively against an upstanding arcuate boss 92 which is formed integrally upon the free-swinging end of a bell-crank 93 which is rockably mounted upon a post 94 formed integrally in and projecting upwardly from the bottom wall 46. At its opposite end, the bell-crank 93 is integrally provided with a flat brake-shoe 95 which is, in turn, provided upon its outwardly presented face with a brake-pad 96 adapted for edgewise bearing engagement against the peripheral face of the disk 67, substantially as shown in FIG. 2.

Disposed encirclingly about the upper end of the post 94 and secured at one end thereto is a helical spring 97, the other end 98 of which extends radially outwardly and is hooked behind the upstanding arcuate boss 92, thereby normally biasing the bell-crank 93 in a counter-clockwise direction (reference being made to FIG. 2) and, at the same time, pushing the pressure-block 87 and the pressure roller 91 forwardly against a forward stop 99. Also operatively mounted upon the upper end of the post 94 is an auxiliary spring 100 which is biased in the opposite direction from the spring 97 and at its other end 101 projects radially outwardly for hooked engagement around an upstanding pin 102 formed integrally in a rearwardly presented recess 103 cut into the rear end of the pressure-block 87. The spring 100 is of much lighter weight than the spring 97 and serves merely to hold the pressure-block 87 resiliently, and in operative engagement, against the arcuate boss 92.

Finally, the guide post 80 is axially drilled and tapped downwardly from its upper end and the top wall 46' is provided with a counter-sunk hole 104 which is in concentric alignment with the post 80. Thus, a locking screw can be threaded through the hole 104 and into the post 80 to hold the top member *t* firmly in closure-forming position upon the bottom member *b*, once the tape winding *w* has been placed upon the core-spool 69. As will be seen by reference to FIG. 2, an endless loop *l* is pulled outwardly from the interior portion of the winding *w*, that is to say, from direct tangency with the core-spool 69 and is twisted into flatwise overlying position as it passes over the upper face of the winding *w* and through the gap *g*. Thereupon, it is again twisted, looped around the post 76, and drawn in an L-shaped path in front of the guide post 80, to the rear of the openings 26, 27, 83, around the guide post 81, the guide post 82, and thence back into tangency with the outermost turn of the winding *w*. It will also be apparent that this loop *l* passes more or less loosely in front of the pressure roller 91.

When the magazine *m* is pushed through the slot 13 and into the position shown in FIG. 7, the spindle-shaft 34 and tape driving roller 35 will, in effect, enter the slot 83. At the same time, the transducers or playback heads 24, 25, will enter the openings 26, 27, and push the loop *l* backwardly somewhat toward the position shown in FIG. 7. The tape driving roller 35 will engage the loop *l* and press it against the pressure roller 91. As the magazine *m* is pushed into finally seated position, the tape driving roller 35 will force the pressure roller 91 and its associated guide-block 87 rearwardly and, at the same time, swing the bell-crank 93 outwardly to non-braking position. The spring pressure thus generated will be balanced by simultaneous compression of the spring 39 so that there will be no tendency to cause the magazine *m* to twist in the horizontal plane, but, rather, the combined spring pressures resulting from the spring 39 and the spring 97 will tend to push the magazine *m* rearwardly against the stop shoulders 16, 17. As shown in FIG. 10, the magazine *m* is inserted through the slot 13 at a slightly forwardly and downwardly inclined angle, and, once it is fully inserted, the magazine *m* is then pushed downwardly into horizontal position upon the cartridge-deck 15, whereupon it will be securely held in operative position against the shoulders 16, 17, by the aforesaid spring pressure. It will thus be evident that the loop *l* of the magnetic tape will be operatively and drivingly positioned between the tape driving roller 35 and the pressure roller 91, so that, when the tape driving roller 35 is rotated by the motor 39, the tape will be constantly transported from the inside of the winding *w* around past the transducers or playback heads 24, 25, and thence back onto the winding *w* for continuous or so-called endless playback.

Whenever it is necessary or desirable to remove the magazine *m*, a finger is inserted into the finger slot 14 and the rearward end of the magazine *m* is lifted upwardly. Thereupon, the spring pressure generated by the springs 39 and 97 will propel the magazine *m* gently outwardly for a substantial distance, so that it can be manually grasped and drawn outwardly through the rectangular opening 13.

It should be understood that changes and modifications in the form, construction, arrangement, and combination of the several parts of the magnetic tape play-back equipment may be made and substituted for those herein shown and described without departing from the nature and principle of my invention.

Having thus described my invention, what I claim and desire to secure by Letters Patent is:

1. A tape play-back machine comprising an outer housing having an elongated opening in one wall thereof, a tape driving roller operatively mounted within the housing in juxtaposition to the opening, a tape magazine having a spool of magnetic tape operatively disposed therein, said tape magazine being sized to fit loosely within said opening so as to be capable of being manually pushed into the interior of the housing through the opening, retention means associated with the housing for retaining the magazine therein after it has been inserted, first and second spring biased means for exerting two symmetrically directed forces against said magazine thereby urging it into engagement with the retention means, said first spring biased means being located in and carried by the tape magazine for pressing a section of magnetic tape tightly against the tape driving roller, said second spring biased means being located in said housing and braking means adapted for engagement with the spool and being yieldably urged into spool-engaging position by the first spring biased means.

2. A tape play-back machine comprising an outer housing having an elongated opening in one wall thereof, a tape driving roller operatively mounted within the housing in juxtaposition to the opening, a tape magazine having a spool of magnetic tape operatively disposed therein, said tape magazine being sized to fit loosely within said opening so as to be capable of being manually pushed into the interior of the housing through the opening, retention means associated with the housing for retaining the magazine therein after it has been inserted, first and second spring biased means for exerting two symmetrically directed forces against said magazine thereby urging it into engagement with the retention means, said first spring biased means being located in and carried by the tape magazine for pressing a section of magnetic tape tightly against the tape driving roller, and braking means mounted in and carried by the tape magazine, said braking means being adapted for engagement with the spool and being yieldably urged into spool-engaging position by the first spring biased means.

3. A tape play-back machine comprising an outer housing having an elongated opening in one wall thereof, a flat shelf-like element within the housing in inward relation to the opening, a tape driving roller operatively mounted within the housing and projecting through the shelf-like element, a tape magazine having a spool of magnetic tape operatively disposed therein, said tape magazine being sized to fit loosely within said opening so as to be capable of being manually pushed into the interior of the housing through the opening, retention shoulders located at the lower margin of said elongated opening and extending upwardly above said shelf-like element for retaining the magazine in said housing after it has been inserted, a pressure roller slidably disposed off-center in and carried by the tape magazine, a spring carried by said magazine for urging the pressure roller toward the driving roller whereby to press a section of magnetic tape tightly against the tape driving roller, said spring and pressure roller being further adapted to exert a reactive force on said magazine thereby urging it toward said elongated opening and into abutment with said retention shoulders, and a counterbalancing spring-biased means for exerting a substantially equivalent force on said magazine and for further urging the magazine into abutment with said retention shoulders, said means being adapted to counteract the twisting effect caused by the off-center reactive force generated by the spring and pressure roller.

4. A tape play-back machine comprising an outer housing having an elongated opening in one wall thereof, a flat shelf-like element within the housing in inward relation to the opening, a tape driving roller operatively mounted within the housing and projecting through the shelf-like element, a tape magazine having a spool of magnetic tape operatively disposed therein, said tape magazine being sized to fit loosely within said opening so as to be capable of being manually pushed into the interior of the housing through the opening, said tape magazine having a forward wall provided with a drive roller opening, first spring-biased means located within said housing for urging said magazine downwardly against said shelf-like element, a pressure roller block slidably disposed in and carried by said magazine for movement to and from said drive roller opening, second spring-biased means for urging said roller block toward said drive roller opening, a pressure roller operatively mounted on said pressure roller block for pressing a section of tape tightly against the drive roller, said pressure roller and pressure roller block being positioned in such a location within the magazine so as to exert an off-center reactive force on said magazine which urges the magazine toward said elongated opening and into abutment with the retention shoulders, and a counterbalancing spring-biased means located in said housing for exerting a substantially equivalent force on said magazine and for further urging the magazine into abutment with the retention shoulders, said means being adapted to counteract the twisting effect caused by the off-center reactive force generated by the cooperative action of the pressure roller and pressure roller block.

References Cited by the Examiner

UNITED STATES PATENTS

| | | | |
|---|---|---|---|
| 2,804,508 | 8/1957 | Mastling et al. | 242—55.13 |
| 2,837,332 | 6/1958 | Busch | 242—55.19 |
| 2,914,620 | 10/1959 | Dale | 242—55.13 X |
| 2,922,642 | 1/1960 | Cousino | 242—55.19 |
| 2,951,654 | 9/1960 | Steelman | 242—55.19 |
| 2,982,489 | 5/1961 | Horres | 242—55.19 |

FOREIGN PATENTS

| | | |
|---|---|---|
| 732,532 | 3/1943 | Germany. |
| 1,094,401 | 12/1954 | France. |
| 914,565 | 1/1963 | Great Britain. |

STANLEY N. GILREATH, *Primary Examiner.*

FRANK J. COHEN, MERVIN STEIN, *Examiners.*

B. S. TAYLOR, *Assistant Examiner.*